Sept. 14, 1965   F. J. LUKETA   3,205,652
NON-SNAGGING LINK COUPLERS FOR TRAWL NETS
Filed Aug. 5, 1963   5 Sheets-Sheet 1

INVENTOR.
FRANK J. LUKETA
BY
ATTORNEYS

Sept. 14, 1965   F. J. LUKETA   3,205,652
NON-SNAGGING LINK COUPLERS FOR TRAWL NETS
Filed Aug. 5, 1963   5 Sheets-Sheet 3

INVENTOR.
FRANK J. LUKETA
BY Mathis & Graybeal
ATTORNEYS

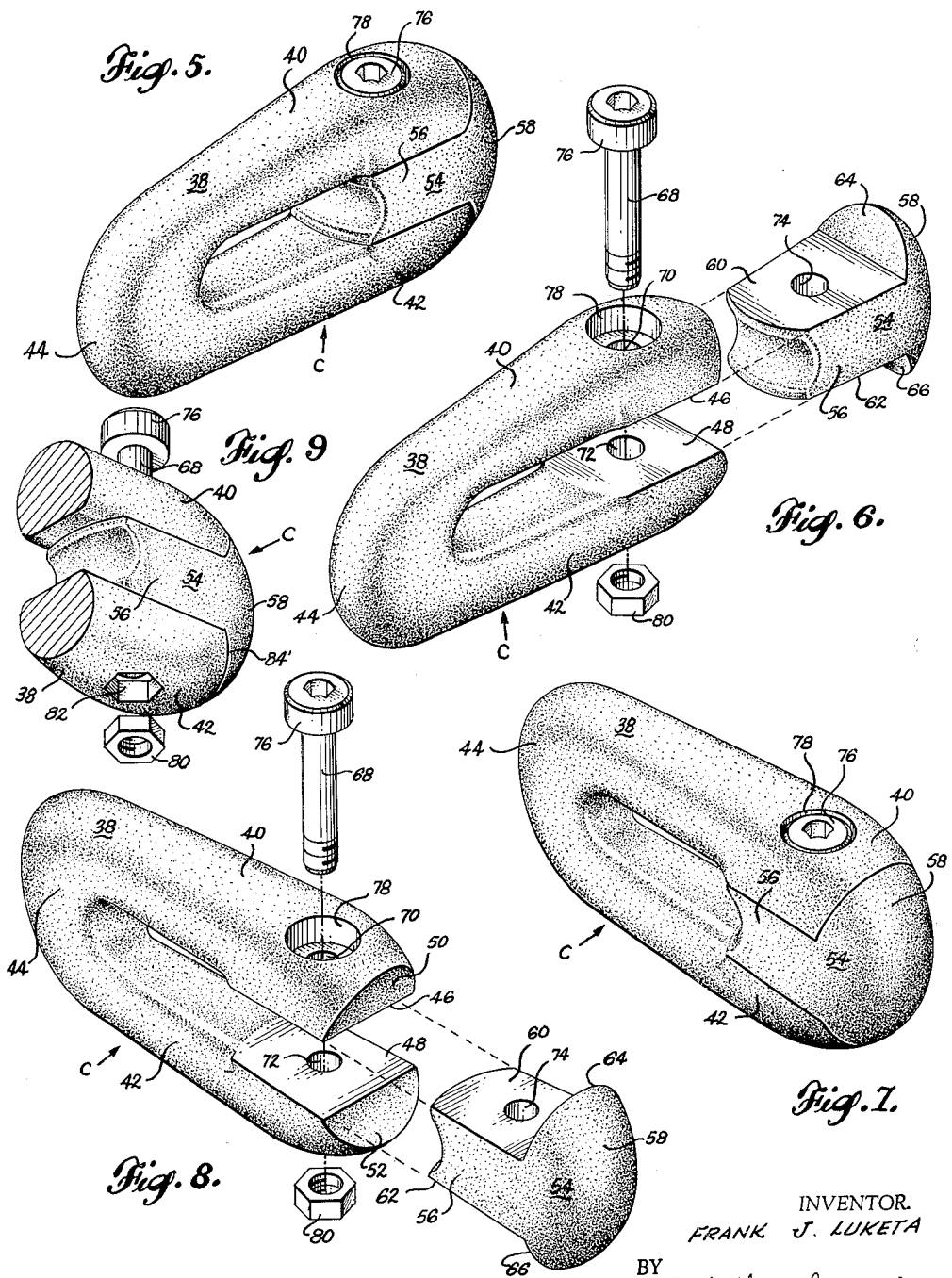

Sept. 14, 1965  F. J. LUKETA  3,205,652

NON-SNAGGING LINK COUPLERS FOR TRAWL NETS

Filed Aug. 5, 1963  5 Sheets-Sheet 5

INVENTOR.
FRANK J. LUKETA
BY
ATTORNEYS

United States Patent Office 3,205,652
Patented Sept. 14, 1965

3,205,652
NON-SNAGGING LINK COUPLERS FOR
TRAWL NETS
Frank J. Luketa, 5567 Greenwood Ave. N., Seattle, Wash.
Filed Aug. 5, 1963, Ser. No. 299,953
6 Claims. (Cl. 59—86)

The present invention relates to non-snagging, detachable link couplers especially designed for use in installations wherein a net or like object of reticular (i.e., having veins or fibers crossing like a network of open mesh) construction is drawn over or otherwise put in relative moving contact with the couplers of the installation.

By way of typical and therefore non-limitive example, non-snagging link couplers characteristics of the present invention have a special utility respecting trawl net suspension arrangements, wherein various suspension elements are coupled together and to a portion of the trawl net at a region surrounded on top and at the sides by additional portions of the said net, and wherein during use or during certain handling operations of the net, the said portions of the net make relative moving contact with the suspension elements and the couplers. Such an environmental arrangement for the subject coupler is disclosed in my copending U.S. application Serial No. 252,089, filed January 17, 1963, and entitled Trawl Net Suspension.

Conventional shackle couplers, which are commonly used in commercial fishing net installations, have projecting parts and are smaller in size than the meshes of a trawl net. For this reason, conventional shackles cannot be satisfactorily employed in fishing net installations wherein moving contact sometimes occurs between the net and the couplers, such as in the aforementioned trawl net suspension arrangement, for example. This is because the meshes of the net snag on the said projecting parts of the conventional shackle, causing the net to foul and/or tear. If fouling of the net occurs during placement thereof in the water, the net will not assume its normal in use position in the water and/or will be ripped. The net must then be hauled back aboard the fishing vessel to be unsnagged and/or repaired and then reset in the water. The principal object of the present invention is to provide a coupler that is incapable of fouling or tearing the net, and thereby obviate additional handling or repairing of the net.

In essence, the non-snagging detachable link coupler of the present invention comprises a major member having a closed bight and an open jaw formed between arm extensions of said bight; a minor member cooperating with said major member to complete the link, said minor member comprising a tongue portion insertable into said jaw and a cap portion positionable outboard the end of said arm; and means for detachably assembling the said major and minor members together to form a completed link that closely resembles a conventional chain link in appearance.

In accordance with the invention, the inner surfaces of the arm include substantially flat "jaw-forming" surfaces; at their ends the said arms present generally flat "lock" surfaces; the top and bottom surfaces of the tongue are flat and are each positionable contiguous one of the jaw-forming surfaces; and the cap presents flat lock surfaces on the inboard side thereof above and below the tongue that match with and are positionable contiguous the said flat lock surfaces formed on the ends of said arms. Also, according to the invention, the outboard end of the cap, the sides of the tongue, and all parts of the major member, excepting the said jaw-forming surfaces and the lock surfaces thereof, present what may be termed "rounded" surfaces of a convex character, while the inboard end of the tongue presents what may be termed a "rounded" surface of a concave character. When the said major and minor members are assembled together, the side surfaces of the tongue and the outboard surface of the cap blend with the respective adjacent surfaces of the arm extension, and the concave surface at the inboard end of the tongue substantially blends with the surfaces situated immediately adjacent to it. Thus, when assembled, the coupler of the invention presents "rounded" surfaces in substantially all directions with no projections or protrusions and for this reason it is characteristically "non-snagging" and "non-chafing."

According to the invention, the major and minor members are retained together by means of a pin element insertable through aligned openings extending through the arms and the tongue. Preferably the pin element is a socket-headed bolt with the socket head thereof being countersunk substantially flush with the outer surface of one of the arms, with the bolt being retained by a nut that is countersunk generally flush with the outer surface of the other arm.

An additional object, feature and advantage of the present invention is the provision of a link-type coupler that is simple in construction, economical to manufacture, and yet is durable and capable of long periods of repetitious use.

Additional objects, features and advantages of the present invention include the provision of a detachable link type coupler that is constructed so as to neither snag nor chafe a trawl net when moving contact occurs between such coupler and the net, as for example, in the trawl net hauling method of my copending application entitled Drum Trawling Method and Apparatus, Serial No. 269,691, filed April 1, 1963, now abandoned.

These and other characteristics and features, objects and advantages of the present invention will be apparent from the following description of certain typical embodiments thereof, taken together with the accompanying illustrations wherein like letter designations and like numerals refer to like parts, and wherein:

FIG. 5 is a perspective view of one form of non-snagging, detachable link coupler constructed according to the present invention;

FIG. 6 is an exploded perspective view of the coupler form of FIG. 5;

FIG. 7 is a perspective view of the coupler form of FIG. 5 taken from a different aspect;

FIG. 8 is another exploded perspective view of the coupler form shown in FIG. 5, but taken from the same aspect as FIG. 7;

FIG. 9 is a fragmentary perspective view of the detachable portion of the coupler of FIG. 5 taken from still another aspect;

Figure 11:
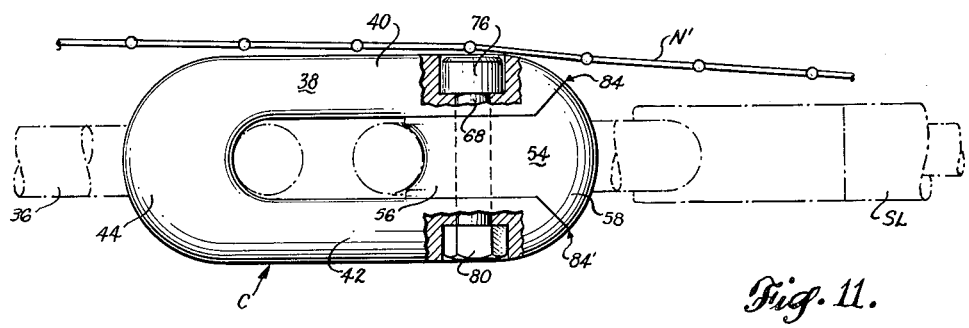
Figure 12:
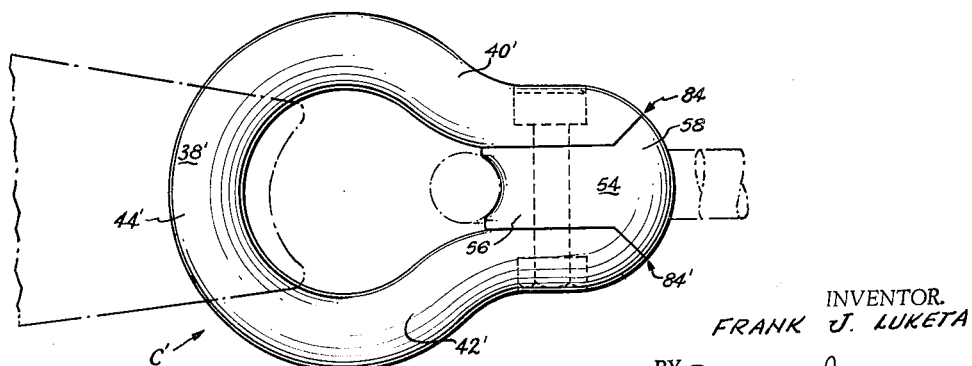

FIG. 11 is a fragmentary side elevational view of a coupler assembly, presenting an instantaneous showing of the net while in moving contact with a non-snagging, detachable link coupler constructed in accordance with the present invention, such view illustrating the non-snagging and non-chafing protection provided by the unique construction of such coupler; and FIG. 12 is a side elevational view of a modified form of non-snagging, detachable link coupler constructed in accordance with the present invention, such modified form possessing an enlarged, semiannular bight portion.

Figure 1:
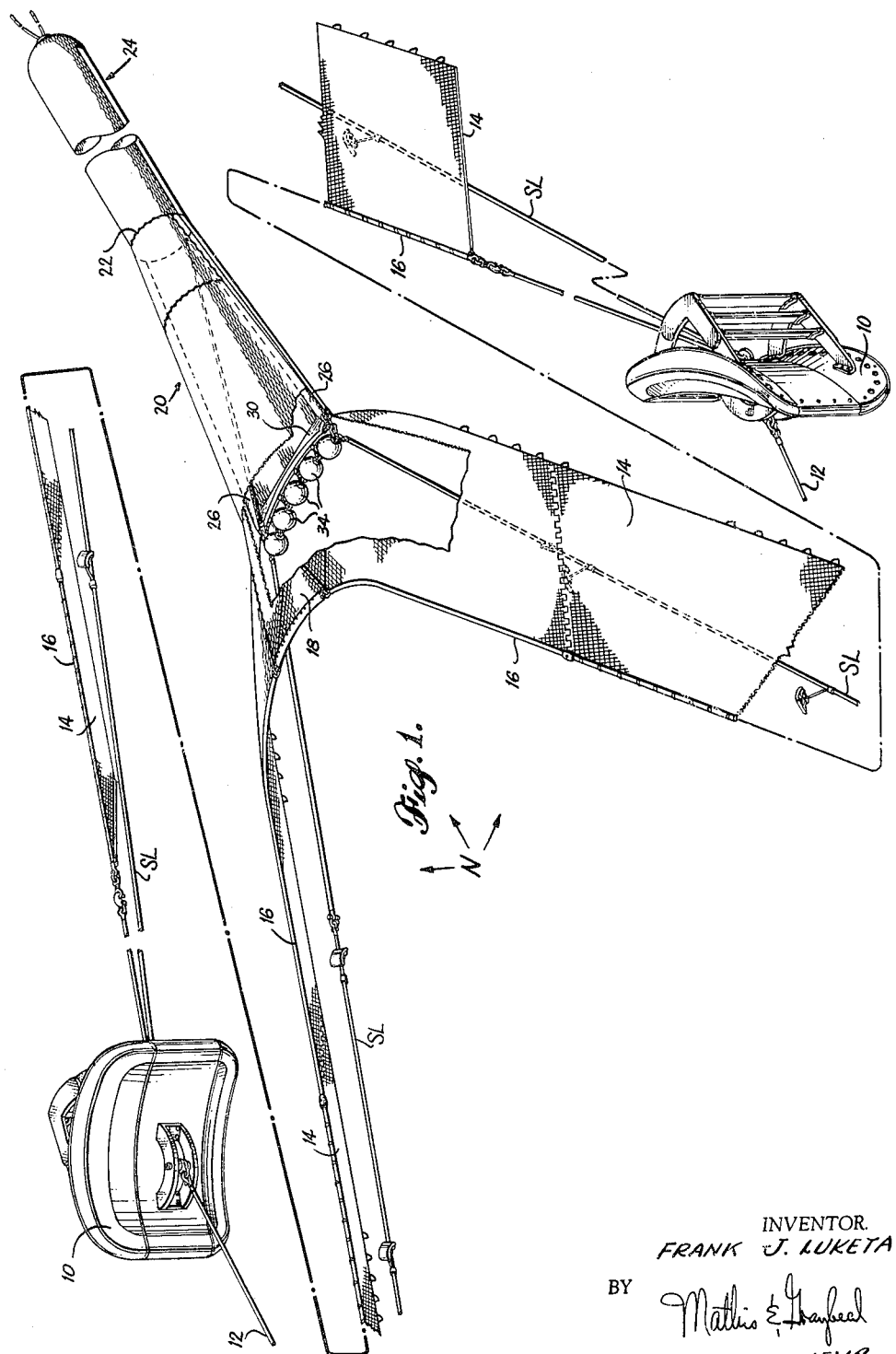
FIG. 1 is a perspective view presented as three related sections, illustrating a bottom trawl net layout with the net broken away in the region above a suspension bar and its associated elements.

Referring more specifically to FIG. 1, the bottom trawl net layout illustrated thereby includes a trawl door 10 at each side of a net N, which doors 10 are dragged forwardly over the ocean bottom by towing warps 12 extending outwardly and aft from a trawler (not shown). The doors 10 spread apart curtains 14 which depend from curtain lines 16. The after ends of curtains 14 connect to the overhang mesh panel 18 of funnel 20, which in turn is connected at 22 with the codend 24 of the net N. Suspenders 26 constructed of mesh material are located on each side and in effect constitute parts of the funnel 20. At their respective forward ends the suspenders 26 are each gathered together and formed into loops 28 by which they are secured to the respective ends of the suspension bars 30. Through the suspension bars 30 and several connecting elements, hereinafter to be described, the forward or looped ends 28 of the suspenders 26 each connects with a sweep line SL which in turn is anchored onto a door 10. The sweep lines SL through the suspenders 26 assume the drag of the codend 24 and its catch.

Figure 2:
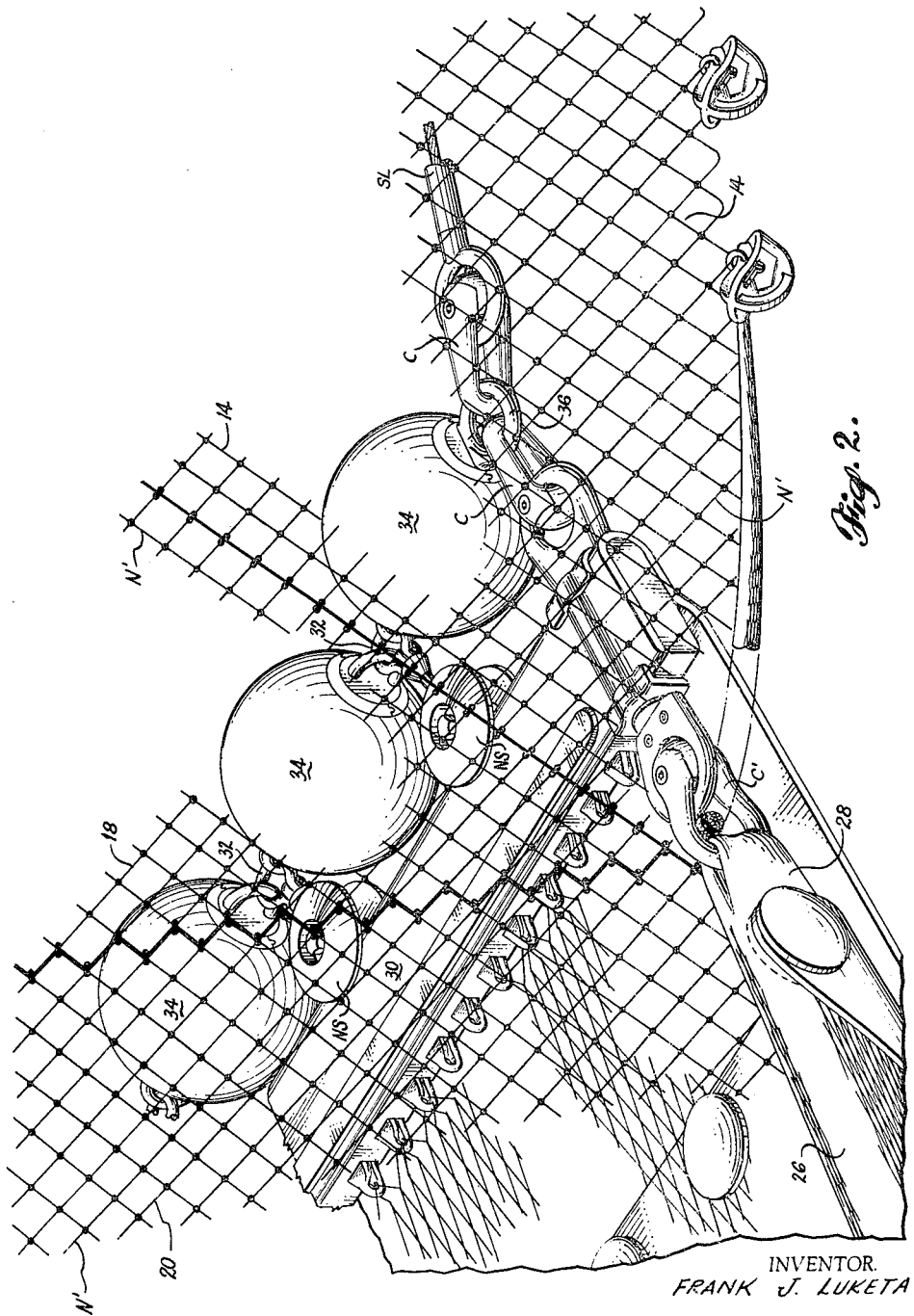
FIG. 2 is an enlarged fragmentary perspective view of the region adjacent one end of the suspension bar, as viewed from an aspect opposite to the view of FIG. 1, such view illustrating non-snagging shackles constructed in accordance with the present invention, used to secure a net suspender and a bobbin line to the suspension bar and the end of a sweep line to an end of said bobbin line.

Referring now to FIG. 2, a transverse bobbin line 32 of link construction extends in front of the suspension bar 30 and at spaced intervals is joined thereto by non-snagging shackles NS, constructed in accordance with the invention presented by my copending application Serial No. 273,617, filed April 17, 1963, and entitled Non-Snagging Shackle Couplers For Trawl Nets. Bobbins 34 are mounted to rotate on bobbin line 32 while the net is being dragged over the bottom. Non-snagging, detachable link couplers, constructed in accordance with the present invention, are used to connect the suspenders 26 to suspension bar 30, the sweep lines SL to rings 36 located on the ends of bobbin line 32, and the ends of suspension bar 30 to the rings 36.

In FIG. 2, portions of funnel 20, the overhanging net panel 18 and a curtain 14 are illustrated in the foreground. During various stages of the handling of the trawl net N, such as during its placement into and removal from the water, for example, these portions of the net, generally designated N', come in moving contact with the various suspension elements, including the non-snagging, detachable link couplers C. Thus, the suspension arrangement of FIG. 2 represents a typical installation in which the non-snagging, detachable link couplers C of the present invention can be advantageously employed to prevent undesirable snagging.

Figure 3:
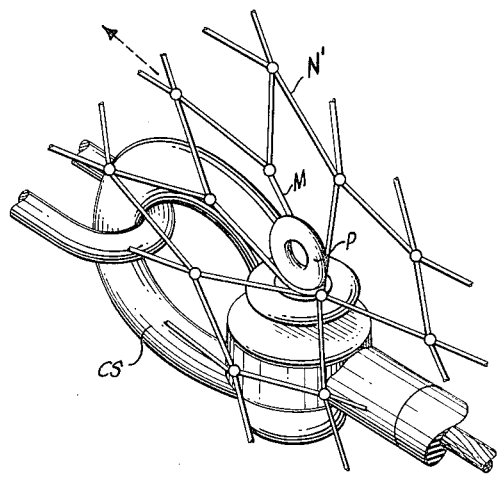
FIG. 3 is a fragmentary perspective view, on an enlarged scale, of a net snagged on the outstanding pin portion of a conventional shackle.
Figure 4:
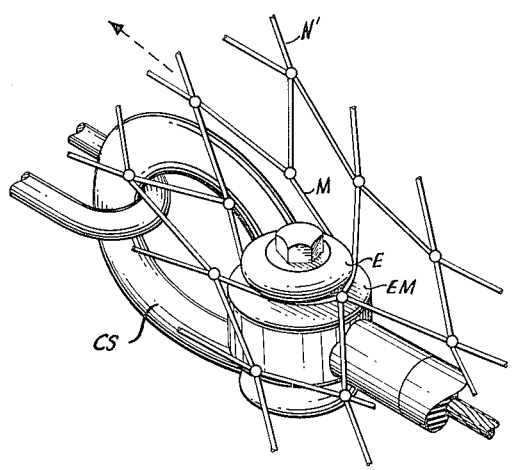
FIG. 4 is a fragmentary perspective view of a net snagged in the recess formed between an eye portion of a conventional shackle and an apertured element employed therewith.
Figure 10:
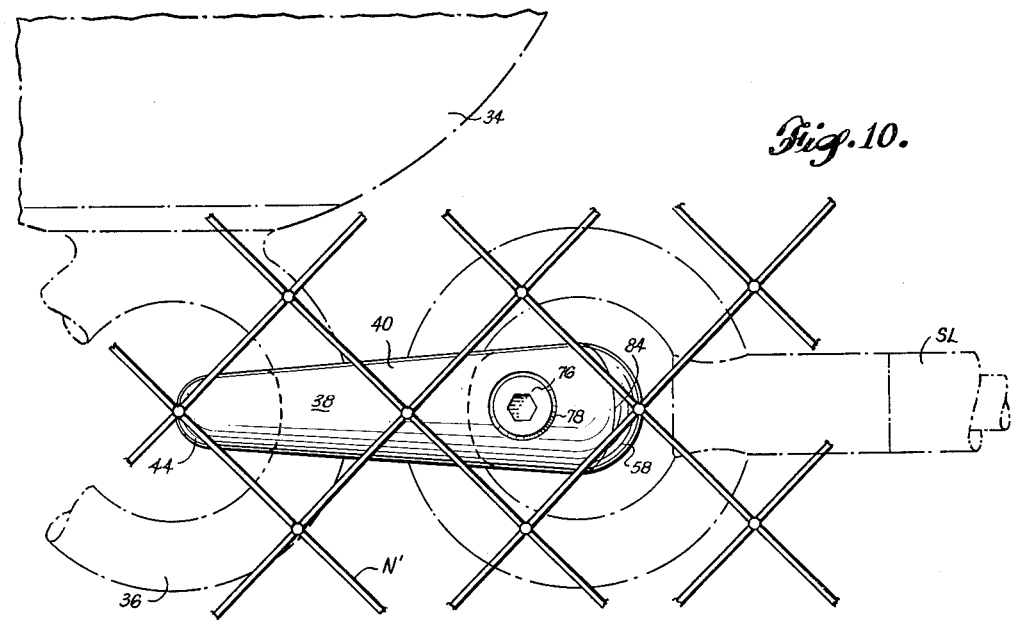
FIG. 10 is a fragmentary top plan view of a net fully distended or relaxed, when the meshes are square in shape, overlying a non-snagging, detachable link coupler of the present invention.

FIGS. 3 and 4 typify snagging conditions that are apt to occur when the netting N' makes relative moving contact with a conventional shackle coupler CS. In FIG. 3 a mesh M of netting N' is shown snagged on the outstanding eye portion of a conventional shackle pin P, with such condition preventing further movement of the netting N' in the direction of pull, as indicated by the arrow, unless tearing occurs. In FIG. 4 the trailing strands of a mesh M are illustrated snagged in the recess formed between an eye portion E of the conventional shackle CS and a single eye member EM, swagged onto the end of a line. In each of these depicted situations involving conventional shackles snagging occurs because the snagged mesh M is larger in size than a projecting portion of the conventional shackle CS on which it is snagged. The non-snagging, detachable link couplers of the present invention possess no projecting parts and therefore cannot snag the strands of the mesh M.

The preferred form of non-snagging, detachable link coupler, shown in FIGS. 5–11, comprises a major element or member 38 consisting of spaced apart and more or less parallel arms 40, 42, extending from a bight or loop end portion 44. At their ends, the arms 40, 42 present inwardly facing, flat, jaw-forming surfaces 46, 48 (FIGS. 6 and 8) and flat lock surfaces 50, 52 (FIG. 8). The coupler C also includes a minor element or member 54 having a tongue portion 56 insertable between the said jaw-forming surfaces 46, 48 and a cap portion 58 positionable immediately outboard the ends of the major element 38.

When the major and minor elements 38, 54, respectively, are assembled, the said jaw-forming surfaces 46, 48 extend contiguous flat top and bottom surfaces 60, 62 formed on the tongue 56, and the said flat lock surfaces 50, 52 extend contiguous matching lock surfaces 64, 66 formed on the inboard side of the cap 58.

A bolt 68 or similar type pin element extends through aligned openings 70, 72, 74, provided in the arms 40, 42 and the tongue 56, respectively, to secure the major and minor members 38, 54 together as an assembly. The bolt 68 is preferably provided with a socket head 76, with such head 76 being countersunk into a circular countersink 78, so as to place the top surface thereof substantially flush with the outer surface of arm 40. The bolt 68 is removably secured in said openings 70, 72, 74 by means of a nut 80. As shown, the nut 80 is countersunk in a countersink 82 substantially flush with the surrounding surface of arm 38, with the countersink 82 being configured to engage the side surfaces of nut 80 and prevent such nut 80 from turning.

Pivotal movement of the minor member 54 about the bolt 68 is prevented because the surface-to-surface contact occurring between lock surfaces 50, 64 and lock surfaces 52, 66 occurs in planes that are offset from the bolt 68 and that have components extending parallel to the center line axis of said bolt 68. The pivotal movement of member 54 is prevented because the said lock surfaces 50, 64 and 52, 66 do not constitute surfaces of revolution about the center line axis of bolt 68.

As perhaps best shown in FIG. 11, in appearance the assembled coupler C closely resembles a conventional chain link, and it possess rounded corners and presents rounded surfaces in substantially all directions. The lock surfaces 50, 52, 64, 66 each extend at an acute angle, e.g., approximately 45°, with respect to the center line axis of the bolt 68. This arrangement locates the surface breaks 84, 84' (FIGS. 11 and 12), representing the two joints that exist at the jaw end of the coupler C between the cap portion 58 of the minor member 54 and the arms 40, 42 of the major member 38, on rounded corners. The rounded corners can then function to cam the net strands to one side or the other of said surface breaks 84, 84' and in that manner prevent the netting N' from snagging on the coupler C at such surface breaks 84, 84'. Also, in the event that a strand of the net aligns itself with a surface break and tends to catch therein, the edge of the surface break against which the strand is being pulled, which edge is itself longitudinally curved, will cam the strand out of the break upon an additional amount of relative movement between the net N and the coupler NC.

In the form of the invention shown in FIG. 12, the bight 44' of the major member 38' constitutes a segment of an annulus so as to present a generally circular inner area. The arm extensions 40', 42' curve inwardly and then straighten out at their ends where they are identical in configuration with the arms 40, 42 of the previously described form of the invention. Referring back to FIG. 2, the coupler form shown in FIG. 12 which may be termed an enlarged ring coupler, is shown advantageously employed for connecting the loop end 28 of a suspender 26 to a ring element attached to the end of the suspension bar 30.

Additional forms, modifications, embodiments and adaptations of the present invention include a link type coupler externally configured like either the coupler form C illustrated specifically in FIGS. 5–11 or the coupler form illustrated specifically in FIG. 12, but wherein the minor member 54 is wedge-shaped and has upper and lower planar surfaces converging from the upper and lower corners of the cap portion to the upper and lower corners of the inboard end of the minor member, and the jaw of the major member is configured to present matching inwardly converging surfaces.

From the foregoing, various further modifications, arrangements and adaptations of the present invention will occur to those skilled in the art to which the invention is adressed, within the scope of the following claims.

What is claimed is:

1. A non-snagging detachable link coupler comprising a first element having a closed bight end and generally parallel arms extending from said bight end, said arms forming a laterally open jaw therebetween; a second element having an inboard portion insertable into said jaw and a rounded outboard portion positionable outboard the ends of said arms; a pin element insertable through aligned openings formed in said arms and the inboard portion of said second element; means for removably securing said pin element in said aligned openings; and means preventing rotation of said second element about said pin element.

2. A non-snagging, detachable link coupler in accordance with claim 1, wherein said means for preventing rotation of said second element about said pin element comprises abutting lock surfaces formed on said second element and on the ends of said arms.

3. A non-snagging, detachable link coupler comprising a major member having a generally loop-shaped closed end and an open jaw end formed by arm extensions of said loop-shaped end; a minor member assemblable with the said major member to complete the link, said minor member having a tongue portion insertable into the jaw end of the major member and a cap portion positionable outboard the ends of the arm extensions; a pin element insertable through aligned openings formed in said arm extensions and said tongue portion; and means for securing said pin element in said openings, with the cap portion of said minor member presenting inboard facing lock surfaces matching with corresponding outboard facing lock surfaces provided on the ends of said arm extension, such arrangement preventing pivotal movement of the minor member about the pin element.

4. A non-snagging, detachable link coupler in accordance with claim 3, wherein the tongue portion of said minor member has a concave shaped inboard end.

5. A non-snagging, detachable link coupler in accordance with claim 3, wherein the lock surfaces on the arm extensions of the major member and the matching lock surfaces on the cap portion of the minor member are each generally uniplanar.

6. A non-snagging, detachable link coupler in accordance with claim 3, wherein the said closed loop end is partly annular and such annular part has a diameter substantially greater than the spacing between the arm extensions at the jaw end.

References Cited by the Examiner

UNITED STATES PATENTS

| | | | |
|---|---|---|---|
| 251,464 | 12/81 | Rogers. | |
| 3,013,356 | 12/61 | Luketa | 43—9 |
| 3,018,581 | 1/62 | Luketa | 43—9 |

ABRAHAM G. STONE, *Primary Examiner.*

F. RAY CHAPPELL, *Examiner.*